US010425622B2

United States Patent
Brudnak (10) Patent No.: US 10,425,622 B2
(45) Date of Patent: Sep. 24, 2019

(54) METHOD OF GENERATING A PREDICTIVE DISPLAY FOR TELE-OPERATION OF A REMOTELY-OPERATED GROUND VEHICLE

(71) Applicant: U.S. GOVERMENT AS REPRESENTED BY THE SECRETARY OF THE UNITED STATES ARMY, Washington, DC (US)

(72) Inventor: Mark J. Brudnak, Rochester Hills, MI (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 15/652,975

(22) Filed: Jul. 18, 2017

(65) Prior Publication Data

US 2019/0058853 A1    Feb. 21, 2019

(51) Int. Cl.
*G05D 1/00* (2006.01)
*H04N 7/18* (2006.01)
*G06T 3/00* (2006.01)

(52) U.S. Cl.
CPC ........... *H04N 7/185* (2013.01); *G05D 1/0038* (2013.01); *G05D 1/0044* (2013.01); *G06T 3/0012* (2013.01)

(58) Field of Classification Search
None
See application file for complete search history.

(56) References Cited

U.S. PATENT DOCUMENTS 7,668,626 B2   2/2010   Katayama et al.
7,761,173 B2   7/2010   Ehrlich
(Continued)

FOREIGN PATENT DOCUMENTS

CN      101434066 B   * 11/2012

OTHER PUBLICATIONS

A. Rachmielowski, N. Birkbeck and M. Jagersand; "Performance evaluation of monocular predictive display"; Robotics and Automation (ICRA), 2010 IEEE International Conference on; Anchorage, AK; May 3-8, 2010; pp. 5309-5314.
(Continued)

*Primary Examiner* — Fernando Alcon
(74) *Attorney, Agent, or Firm* — Gregory P. Gibson; Gary A. Smith (57) ABSTRACT

A method for generating a predictive image to enable remote control of an unmanned ground vehicle (UGV) under conditions of long communications latency. An original digital image of the UGV environment (from a UGV-mounted camera) is projected forward such that a lower portion falls on a ground plane defined to approximate the UGV's travel surface and an upper portion falls on a far plane defined approximately normal to the ground plane and forward of the UGV. A perspective transformation technique used to generate the predicted image separates the ground plane image from the far plane image. Two separate mathematical perspective transforms are defined and applied, one for the lower (ground plane) part of the image, and one for the upper (far plane) part of the image. The resulting predicted upper and lower image are rejoined to form the complete predicted image, which may then be presented on a video screen.

20 Claims, 6 Drawing Sheets

(56) References Cited

U.S. PATENT DOCUMENTS

| | | | |
|---|---|---|---|
| 8,774,950 B2 | 7/2014 | Kelly et al. | |
| 8,996,598 B2 | 3/2015 | Krogh | |
| 2007/0276541 A1 | 11/2007 | Sawasaki | |
| 2009/0276105 A1* | 11/2009 | Lacaze | G05D 1/0044 |
| | | | 701/2 |
| 2010/0241289 A1* | 9/2010 | Sandberg | G06T 1/0014 |
| | | | 701/2 |
| 2014/0324249 A1* | 10/2014 | Lacaze | G05D 1/0038 |
| | | | 701/2 |
| 2015/0057801 A1 | 2/2015 | Stephens, Jr. | |
| 2016/0236617 A1* | 8/2016 | Smyth | G01P 3/38 |
| 2018/0150718 A1* | 5/2018 | Omari | B64C 39/024 |

OTHER PUBLICATIONS

Bob Ricks, Curtis W. Nielsen, Michael A. Goodrich; "Ecological Displays for Robot Interaction: A New Perspective"; 2004 IEEE/RSJ International Conference on Intelligent Robots and Systems (IROS) (IEEE Cat. No. 04CH37566); IEEE 2004.

Alonzo Kelly et al.; "Real-Time Photorealistic Virtualized Reality Interface for Remote Mobile Robot Control"; 2009; Proceedings of International Symposium of Robotics Research.

Kevin J. Bradshaw, Ian D. Reid, David W Murray; "The Active Recovery of 3D Motion Trajectories and Their Use in Prediction"; IEEE Transactions on Pattern Analysis and Machine Intelligence; vol. 19, No. 3; Mar. 1997.

J. Arrospide, L. Salgado, M. Nieto, R. Mohedano; "Homography-based Ground Plane Detection Using a Single On-board Camera"; 2010; Institution of Engineering and Technology, Intelligent Transport Systems; vol. 4, Issue 2; Jun. 2010.

Brudnak, Mark J.; "Predictive Displays for High Latency Teleoperation"; 2016 National Defense Industrial Association Ground Vehicle Systems Engineering and Technology Symposium; Novi, MI; Aug. 2, 2016; obtained from https://www.researchgate.net/publication/305904651_PREDICTIVE_DISPLAYS_FOR_HIGH_LATENCY_TELEOPERATION (Cited under heading "Statement Regarding Prior Disclosures by the Inventor" on p. 1 of the specification).

D. Cobzas and M. Jagersand, "Tracking and PredictiveDisplay for a Remote Operated Robot using Uncalibrated Video," in Proceedings of the 2005 IEEE International Conference on Robotics and Automation, ICRA 2005, 2005.

R. Held, A. Efstathiou and M. Greene, "Adaptation to displaced and delayed visual feedback from the hand," J. Exp Psych, vol. 72, pp. 871-891, 1966.

M. Brudnak, M. Pozolo, A. Meldrum, T. Mortsfield, A. Shvartsman, W. Smith, J. Goodell and D. Holtz, "Virtual Combat Vehicle Experimentation for Duty Cycle Measurement," SAE Int. J. Commer. Veh., vol. 1, No. 1, pp. 54-70, 2009.

T. Ersal, R. B. Gillespie, M. Brudnak, J. L. Stein and H. K Fathy, "Effect of coupling point selection on distortion in internet-distributed hardware-in-the-loop simulation," in American Control Conference, San Francisco, CA, 2011.

T. Ersal, M. Brudnak, J. L. Stein and H. K. Fathy, "Statistical transparency analysis in internet-distributed hardware-in-the-loop simulation," IEEE/ASME Transactions on Mechatronics, vol. 17, No. 2, pp. 228-238, 2012.

T. Ersal, M. Brudnak, A. Salvi, J. L. Stein, Z. Filipi and H. K. Fathy, "Development and model-based transparency analysis of an Internet-distributed hardware-in-the-loop simulation platform," Mechatronics, vol. 21, No. 1, pp. 22-29, 2011.

T. Ersal, Y. Kim, A. Salvi, J. Siegel, A. Stefanopoulou, J. L. Stein, M. J. Brudnak and Z. Filipi, "A method to achieve high fidelity in internet-distributed hardware in-the-loop simulation," in NDIA Ground Vehicle Systems Engineering and Technology Symposium, Troy, MI, 2011.

T. Ersal, M. Brudnak, A. Salvi, Y. Kim, J. B. Siegel and J. L. Stein, "An Iterative Learning Control Approach to Improving Fidelity in Internet-Distributed Hardware in-the-Loop Simulation," Journal of Dynamic Systems, Measurement, and Control, vol. 136, No. 6, 2014.

X. Ge, M. M Brudnak, J. L Stein and T. Ersal, "A Norm Optimal Iterative Learning Control Framework towards Internet-Distributed Hardware-In-The-Loop Simulation," in American Control Conference, Portland, OR, 2014.

A. Tandon, M. J. Brudnak, J. L. Stein and T. Ersal, "An observer based framework to improve fidelity in internet-distributed hardware-in-the-loop simulations," in Dynamic Systems and Control Conference, Palo Alto, CA, 2013.

X. Ge, Y. Zheng, M. J. Brudnak, P. Jayakumar, J. L. Stein and T. Ersal, "Performance Analysis of a Model-Free Predictor for Delay Compensation in Networked Systems," in IFAC Time Delay Systems Workshop, Ann Arbor, MI, 2015.

Y. Zheng, M. Brudnak, P. Jayakumar and T. Ersal, "An Experimental Evaluation of a Model-Free Predictor Framework in Teleoperated Vehicles," in 13th IFAC Workshop on Time Delay Systems, Istanbul, 2016.

X. Ge, M. Brudnak, P. Jayakumar, J. L. Stein and T. Ersal, "A Model-Free Predictor Framework for Tele-Operated Vehicles," in American Control Conference, Chicago, IL, 2015.

F. Chucholowski, S. Buchner, J. Reicheneder and M. Lienkamp, "Prediction Methods for Teleoperated Road Vehicles," in Conference on Future Automotive Technology—Focus Electromobility, Munich, Germany, 2012.

D. Lovi, N. Birkbeck, A. H. Herdocia, A. Rachmielowski, M. Jagersand and D. Cobzas, "Predictive Display for Mobile Manipulators in Unknown Environments Using Online Vision-based Monocular Modeling and Localization," in Proceedings of the IEEE/RSJ International Conference on Intelligent Robots and Systems, 2010.

E. Royer, M. Lhuillier, M. Dhome and J.-M. Lavest, "Monocular Vision for Mobile Robot Localization and Autonomous Navigation," International Journal of Computer Vision, vol. 74, No. 3, p. 237-260, 2007.

A. Kelly, N. Chan, H. Herman, D. F. Huber, R. Meyers, P. Rander, R. Warner, J. Ziglar and E. capstick, "Real Time Photorealistic Virtualized Reality Interface for Remote Mobile Robot Control," in Proceeding of International Symposium of Robotics Research, 2009.

R. Romano, "Real-Time Multi-Body Vehicle Dynamics Using a Modular Modeling Methodology," in SAE World Congress, Detroit, MI, 2003.

V. Paul, M. Brudnak, J. Ueda and A. Shvartsman, "Simulation-based Hybrid-Electric Combat Vehicle Duty Cycle Measurement," in Intelligent Vehicle Systems Symposium, NDIA, Traverse City, MI, 2006.

M. Simon, M. Compere, T. Connolly, C. Lors, W. Smith and M. Brudnak, "Hybrid Electric Power and Energy Laboratory Hardware-in-the-Loop and Vehicle Model Implementation," in SAE World Congress, Detroit, MI, 2006.

F. Chucholowski, M. Sauer and M. Lienkamp, "Evaluation of Display Methods for Teleoperation of Road Vehicles," in 9th International Conference on Intelligent Unmanned Systems, 2013.

* cited by examiner

METHOD OF GENERATING A PREDICTIVE DISPLAY FOR TELE-OPERATION OF A REMOTELY-OPERATED GROUND VEHICLE

GOVERNMENT INTEREST

The inventions described herein may be made, used, or licensed by or for the U.S. Government for U.S. Government purposes without payment of royalties to me.

STATEMENT REGARDING PRIOR DISCLOSURES BY THE INVENTOR

The subject matter disclosed herein was the subject of a technical paper titled "PREDICTIVE DISPLAYS FOR HIGH LATENCY TELEOPERATION" presented at the 2016 National Defense Industrial Association Ground Vehicle Systems Engineering and Technology Symposium conducted in Novi, Mich., on Aug. 2, 2016. The paper has been published online at: https://www.researchgate.net/publication/305904651_PREDICTIVE_DIS-PLAYS_FOR_HIGH_LATENCY_TELEOPERATION

TECHNICAL FIELD

The present invention relates to remotely-operated ground vehicles (UGVs) and to a method of tele-operation of such UGVs that corrects for a latency period caused by the time delay inherent in wireless communication between the UGV and a control/viewing station.

BACKGROUND

In the United States Army, tele-operation of Unmanned Ground Vehicles (UGVs) is widely employed for the control of small UGVs (S-UGV) performing missions such as Counter Improvised Explosive Device (C-IED) and Explosive Ordinance Disposal (EOD). For these missions, the speeds are generally low and the operator is usually in close proximity to the S-UGV, yielding low latency due to wireless communication and, therefore, responsive control is easily achieved wherein the human operator functions as they would in an actual vehicle.

Tele-operation over relatively long-distances, however, may (depending upon the speed and quality of the wireless communications links available, among other factors) introduce significant latency which can degrade the operator's ability to drive/control the vehicle. Delays in closed-loop control systems are one of the well-known sources of degraded performance and/or stability. Although, in the case of tele-operation, the human-in-the-loop is a stabilizing factor and may provide robust compensation against instability, the human's ability to respond to the visual inputs begins to degrade at delays above 50 ms and performance is so degraded at 200-300 ms that the operator must change his/her control approach from continuous steer to the slower and more error prone "move and wait." The "move and wait" approach requires the operator reduce speed to mitigate against the delay, which significantly degrades performance and lowers the achievable top speed. As such, the mitigation of this latency is a fundamental challenge to achieving tele-operation under high latency.

There also exists the problem of predicting system behavior in the presence of delays and the challenge of incorporating the prediction into the control algorithm. Some methods strive to place the predictors in-line either predicting a future state of the system or of the operator. Since the standard tele-operation scenario incorporates a video feed being sent back to the operator, this is still delayed by the amount of transport delay between the vehicle and the operator. Furthermore, the video's data, being a series of raster images, is not subject to explicit prediction because its values are not the result of a natural evolution of system states. In this case, researchers have undertaken methods to present information in the video stream to help the operator understand the true state of the system. In these cases, many have undertaken to overlay the display with graphics to include vehicle surrogates and lane markers. Others have undertaken to physically manipulate the video images to estimate what the driver would see if the stream were not delayed.

SUMMARY

This disclosure includes development of a state estimator and predictive display system which (1) requires minimal intervention on the vehicle and (2) is as simple as possible. Furthermore, it seeks to present feedback to the operator in the most natural way practical. The predictive display approach is predicated on the assumption that a vehicle camera scene at time t is very similar to a prior scene (i.e. at time t−2D). This approach seeks to predict a current view from a past view using a predictive model in order to adjust the vantage point in accordance with expected movement of the camera during the communications delay time period.

Embodiments of the present invention present a method to mitigate high latency through display prediciton and state estimation. The latency mitigation approach is implemented using a feed-forward vehicle model as a state estimator which drives a predictive display algorithm. The state estimator consists or a reduced order model which seeks to achieve an immediate estimate of how the vehicle will respond to the commanded inputs. It furthermore contains a correction term which tracks the relevant vehicle states over the long-term. The predictive display uses perspective transformation techniques to predict what a camera would see from a different location given a video frame taken from a different location. These components work together to help the operator receive immediate feedback regarding his/her control actions.

The invention method involves dividing an original digital image of the UGV environment (obtained from a camera mounted to a UGV) into a lower portion that is assumed to fall on a ground plane defined to approximate the surface on which the UGV is travelling and an upper portion that is assumed to fall on a far plane defined approximately normal to the ground plane and forward (in the direction of travel) of the UGV.

After a predicted image plane is determined based on the location and orientation of the camera at the future time (initial time plus time of round-trip communication delay), the perspective transformation techniques used to generate the predicted image are implemented in a manner the separates the ground plane image from the far plane image: Two separate mathematical perspective transforms are defined and applied, one for the lower (ground plane) part of the image, and one for the upper (far plane) part of the image. This generates a predicted lower image and a predicted upper image which are then rejoined (using conventionally-known techniques) to form the complete predicted image, which may then be presented on a video screen to an operator or viewer.

In a disclosed embodiment of the invention, a method of generating a predictive image on a video display during tele-operation of an unmanned ground vehicle (UGV) to adjust for a round-trip wireless communication delay period between the video display and the UGV during vehicle movement over the delay period comprises:

obtaining a digital image of a vehicle environment from a camera onboard the UGV at an initial time; defining an initial image plane established by the position of the camera at the initial time; defining a ground plane approximately tangent to a traction-producing means of the UGV, a far plane approximately normal to the ground plane and offset from the UGV in a direction-of-movement of the UGV, and an apparent horizon line at an intersection between the ground plane and the far plane; mathematically projecting a set of points defining an extent of the digital image from the initial image plane onto the ground plane and the far plane; projecting the apparent horizon line onto the initial image plane; defining a predicted image plane established by a predicted camera position at a future time assuming movement of the UGV in accordance with a vehicle dynamics model and a state estimator during the communication delay period; mathematically projecting an upper projected frame from the far plane onto the predicted image plane, and a lower projected frame from the ground plane onto the predicted image plane, the upper and lower projected frames combining to define a perspective adjusted frame; defining a first mathematical perspective transform to map the upper projected frame onto a corresponding upper portion of the perspective adjusted frame; defining a second mathematical perspective transform to map the lower projected frame onto a corresponding lower portion of the perspective adjusted frame; generating a predicted upper image on an upper portion of the predicted image plane by performing the first mathematical perspective transform on an upper portion of the digital image; generate a predicted lower image on a lower portion of the predicted image plane by performing the second mathematical perspective transform on a lower portion of the digital image; rejoining the predicted lower image and the predicted upper image to create the predictive image; and displaying the predictive image using the video display.

BRIEF DESCRIPTION OF THE DRAWINGS

Embodiments of the present invention described herein are recited with particularity in the appended claims. However, other features will become more apparent, and the embodiments may be best understood by referring to the following detailed description in conjunction with the accompanying drawings, in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figures 1, 2, 3, 4:
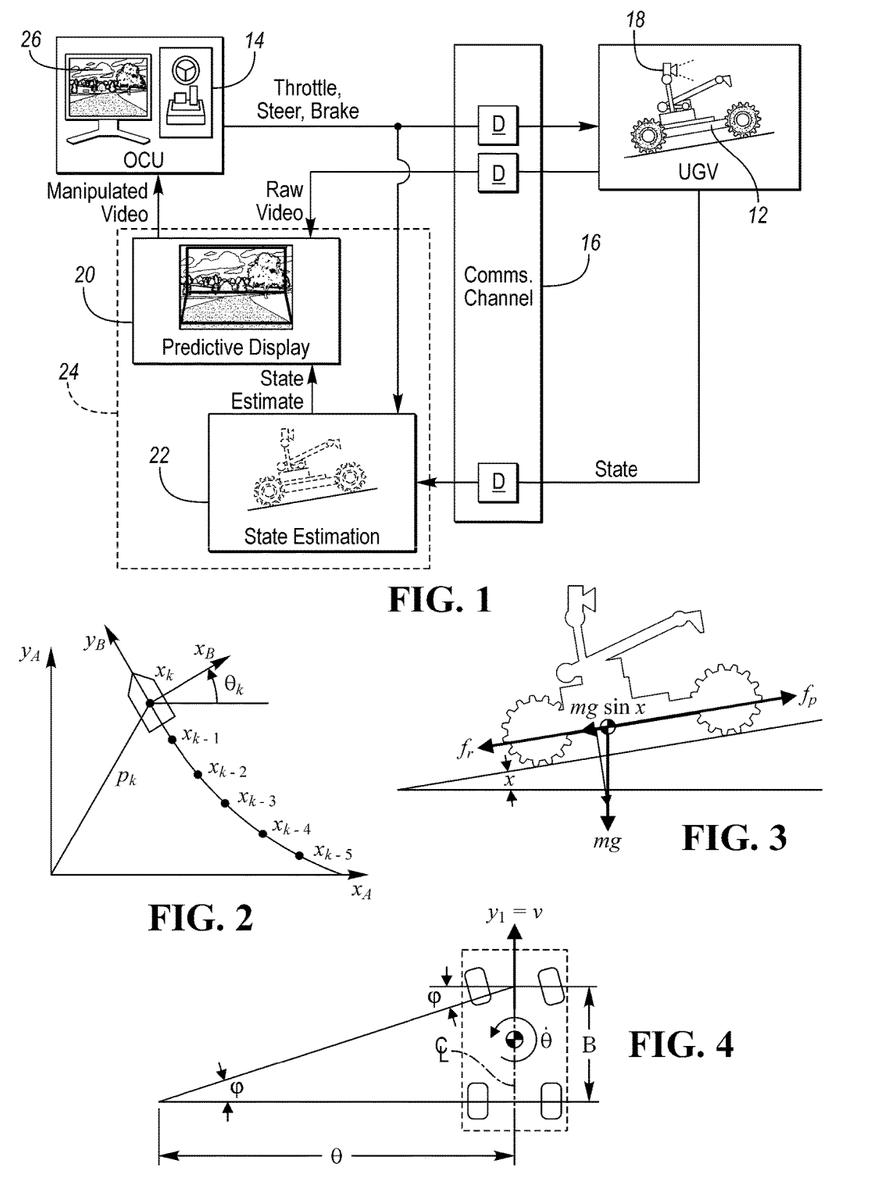
FIG. 1 is an schematic overview of a system according to an embodiment of the invention.
FIG. 2 depicts a state estimator as used in an an embodiment of the invention.
FIG. 3 illustrates aspects of a vehicle dynamic model as used in an embodiment of the invention.
FIG. 4 illustrates further aspects of a vehicle dynamic model as used in an embodiment of the invention.

FIG. 1 is a schematic diagram generally depicting elements and interrelationships of a system for performing the disclosed method. An unmanned ground vehicle (UGV) 12 is connected with an operator control unit (OCU) 14 by a multi-channel, two-way wireless communication link 16. A digital camera 18 is mounted on UGV 12 and collects images of a vehicle environment in a direction of movement of the vehicle, and this raw video is passed to a predictive display (PD) module 20 that is preferably co-located with the OCU 14. Information describing the dynamic state of UGV 12 is also passed via the communication link 16 to a state estimation (SE) module 22. Operator commands such as throttle, brake and steer are also sent from the OCU 14 to the SE 22 within the digital processor 24. SE module 22 uses both the operator commands from the OCU 14 and the dynamic state from the UGV 12 to estimate motion of the UGV 12. PD module 20 and SE module 22 may be parts of (or software routines run on) a digital processor 24, as is well known in the computer arts. The raw video from the vehicle camera 18 is manipulated as determined by the SE module 22 and PD module 20 (as is described in detail below) to generated a predictive display, and the predictive display is presented on a video display 26, which may be part of or collocated with the OCU 14. The predicative display enabled an operator of the UGV 12 to make inputs to the OCU 14 (steering, throttle, and braking, at the most basic level) which are wirelessly communicated to the UGV through the communications link 16.

It is understood that the OCU 14 and/or video display 26 may take forms other than those depicted schematically in FIG. 1. Possible examples of alternative devices/components are a hand-held controller incorporation a display screen, or virtual reality goggles/headset and/or gloves.

The state estimator (SE) is derived as follows. As illustrated in FIG. 2, the SE is a planar model with three degrees of freedom defined by $p_k=[x_k \; y_k]$ and $\theta_k$, where time is discretized with the index k. In this system, the state is represented as $x_k=[p_k^T \; \theta_k]$. These are stored in the global coordinate system denoted by the subscript A. The local coordinate system, denoted by B, is used to update the rate states which are then translated into the global frame for integration. The rates are denoted as $\dot{y}_B$ and $\dot{\theta}$. The state estimator feedforward dynamics consist of a longitudinal model and a lateral/yaw model. The inputs to the vehicle coming from the OCU are denoted as throttle, $t_k$, brake, $b_k$, and steer, $s_k$, and are passed as unitless values normalized to a maximum of 100. The equations of motion are modeled as continuous differential equations and then discretized using the Euler approximation. The acceleration equations are as follows:

$$\ddot{y}_B = \frac{1}{M}(f_p(t_k, \dot{y}_B) + f_r(b_k, \dot{y}_B) + f_g(\chi)) \quad (1)$$

and $$\ddot{\theta}_B = \frac{1}{I} f_s(s_k, \dot{y}_B). \quad (2)$$

These accelerations are integrated to obtain velocity states $\dot{y}_B$ and $\dot{\theta}_B$, which are then translated into the global frame using the rotation matrix $R_A^B$ yielding $$\dot{p}_A = R_A^B \begin{bmatrix} 0 \\ \dot{y}_B \end{bmatrix}. \quad (3)$$

These are integrated to yield the new global position $x_A$ and $\theta_A$ which are then stored (along with the corresponding time $t_k$) in a circular buffer for later use. The corresponding homogeneous matrix $$H_A^B = \begin{bmatrix} R_A^B & p_k \\ 0^T & 1 \end{bmatrix}$$

represents the combination of the rotation and translation of the local coordinate system, B.

The longitudinal dynamics, governed by $f_p(t_k, \dot{y}_B)$, $f_r(b_k, \dot{y}_B)$, and $f_g(\chi)$, determine the instantaneous speed of the vehicle. Most problems with tele-operation over a high-latency communications channel have to do with over-correction of steer direction and not speed, mostly because the vehicle is less sensitive to throttle and brake than it is to steer. That being said, because turning rate is dependent on speed, it is important that the speed be accurate to assure good yaw rate estimates. The equations for the longitudinal model use the illustration in FIG. 3. There are three components of the force which act longitudinally. First, $f_p$ accounts for the propulsion force which is dependent on the throttle input and the velocity of the vehicle. With the goal of being as simple as possible, the following equation is used for the propulsion forces $$f_p = MA_{max} \frac{|V\max - \dot{B}|}{V\max} \frac{tk}{100}, \quad (4)$$

where M is the vehicle mass, $A_{max}$ is the maximum acceleration available to the vehicle, and $V_{max}$ is the maximum velocity of the vehicle and $t_k \in [0,100]$. Note that this is intentionally designed to be governed by a few high-level parameters. Likewise the forces which oppose motion are lumped into $f_r$ and these include the braking and drag. These are again modeled as simply as possible.

$$f_b = \begin{cases} -MB_{max} \text{sign} \dot{y}_B \frac{b_k}{100}, & |v| > 0.1 \\ 0, & \text{otherwise} \end{cases} \quad (5)$$

where M is the vehicle mass, $B_{max}$ is the maximum braking acceleration, $b_k \in [0,100]$ is the brake command, and sign $$v = \frac{v}{|v|}, v \neq 0$$

returns the sin of its argument. The drag forces are $$f_d = -\frac{A_f C_d}{2} \rho |\dot{y}_B| \dot{y}_B, \quad (6)$$

where $A_f$ is the cross sectional area, $C_d$ is the drag coefficient, and $\rho$ is the density of air.

Finally gravity component due to grade is $$f_g = -MG \sin \chi, \quad (7)$$

where G is the acceleration due to gravity (i.e. 9.8 m/s²), and $\chi$ is the pitch angle of the vehicle.

Lateral/yaw dynamics are illustrated in FIG. 4. As discussed, it is more important for the yaw state to be accurate since a vehicle is typically much more responsive to steering inputs than to longitudinal inputs. Based on the kinematics shown in FIG. 4, it is reasonable to use $$\dot{\theta} = \frac{\dot{y}_B}{B} \tan \varphi,$$

however, the form shown in equation (2) is more desirable because the correction term can then work through an integrator rather than directly on the state. In that case, $$f_s = \frac{I}{\Delta t}\left(\frac{\dot{y}_B}{B} \tan\left(\beta \frac{s_k}{100}\right) - \dot{\theta}\right) \quad (8)$$

where I is the yaw moment of inertia, B is the wheel base of the UGV, $\beta$ is the steering scale factor which accounts for gain and conversion to radians, $s_k \in [-100, 100]$ is the steer command, $\dot{\theta}$ is the current yaw rate, and $\Delta t$ is the time step of the dynamics model. (Note that the relationship to FIG. 4 is that $$\varphi = \beta \frac{s_k}{100}.)$$

Figure 5:
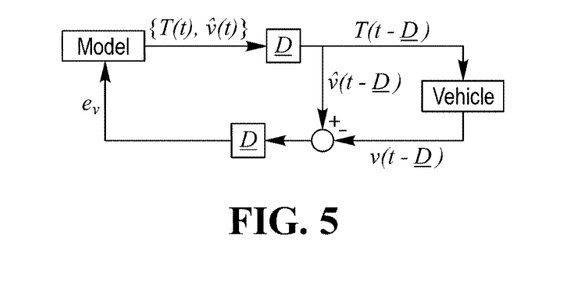
FIG. 5 illustrates a control system block diagram with skew-corrected feedback as used in an embodiment of the invention.

Regardless of the accuracy of the feedforward model, states tend to drift. It is therefore necessary to add a feedback term. As such, the two terms that are subject to correction are the speed $\dot{y}$, and the yaw rate $\dot{\theta}$. First note that the design employs remote error computation. In this method, the estimated state is sent to the UGV 12 along with the vehicle commands. The estimated state is then compared to the actual state on the vehicle and the error is sent back to the OCU 14 (see FIG. 5). In this way, the error computation is uninfluenced by time skew. The error is then used to close the gap between the estimated and measured states, understanding that it is 2D seconds old. The rate of correction must account for the arrival of new error information every 10 ms (i.e. the state estimator runs at 100 Hz). The correction gain is therefore set so that the error will be closed in about 100 ms. Equations (1) and (2) then become $$\ddot{y}_B = \frac{1}{M}(f_p(t_k, \dot{y}_B) + f_r(b_k, \dot{y}_B) + f_g(\chi)) - g_v e_{\dot{y}_B} \quad (9)$$

and $$\ddot{\theta}_B = \frac{1}{I} f_s(s_k, \dot{y}_B) - g_{\dot{y}} e_{\dot{\theta}_B} \quad (10)$$

where $g_v$ and $g_{\dot{y}}$ are the gains for the correction terms. In this disclosed example, they are both set to 10.

Predictive Display.

Figure 6:
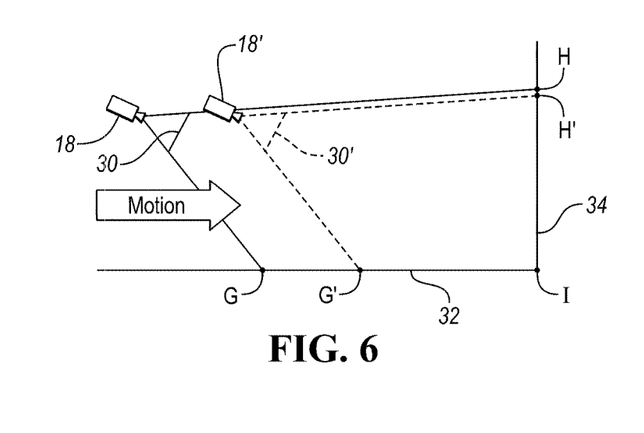
FIG. 6 illustrates initial and predicted positions of a UGV-mounted camera and their respective image planes.
Figure 7A:
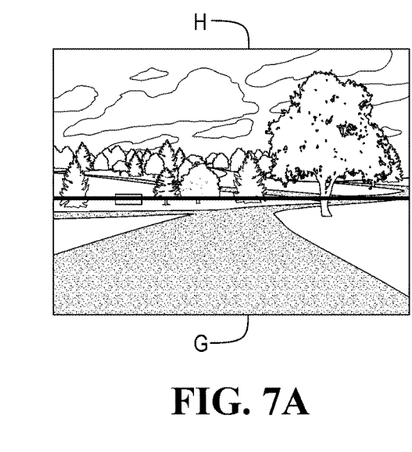
FIGS. 7A-7C illustrate progressive steps in an image perspective transform according to an embodiment of the invention.
Figure 7B:
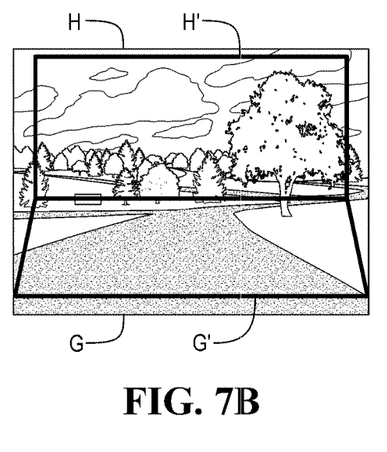
Figure 7C:
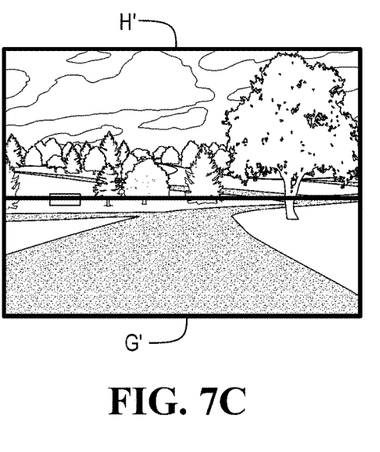

The concept of the predictive display disclosed herein may be explained, in a greatly simplified form, with reference to FIGS. 6 and 7. FIG. 6 illustrates two positions of the camera 18, 18' as it moves, along with the vehicle, from left to right (FIGS. 6 and 7 illustrate only forward motion, for simplicity of description). The first position (at left in the figure) shows the camera 18 and the image plane 30 established by the camera (using a pinhole camera model, as is well known in the field of computer/synthetic vision) at an initial time $t_i$, with no delay caused by communication between the UGV and a remote operator. At initial time $t_i$, upper and lower rays extending from the camera 18 focal point through the image plane 30 define the vertical extents of the field-of-view of the camera. The upper and lower rays are geometrically projected onto a ground plane 32 and a far plane 34 which are defined relative to the vehicle and/or camera 18. In FIG. 6, the point where the lower ray intersects the ground plane 32 is identified as G, the point where the upper ray intersects the far plane 34 is identified as H, and the point where the ground and far planes intersect is identified as I. Note that this simplified, profile view neglects the horizontal width/depth of image planes 30, 30', ground plane 32 and far plane 34. When the image width is considered (as described below in relation to FIG. 7), the points G, H, and I actually define horizontal lines extending out of the plane depicted in FIG. 6.

The second position (at right in the figure) is the camera 18' and its respective image plane 30' (shown in dashed lines) after the movement of the UGV that is predicted (by the SE 22) to take place during the round-trip communications delay period (also known as latency) 2D. Thus, the predicted image plane 30' is a representation of where the camera will be at future time $t_f = t_i + 2D$. The upper and lower rays (shown in dashed line) now intersect the far and near planes at points H' and G' respectively.

The points G, H, and I are then projected back through the focal point of the new (predicted) camera position 18' and onto the new image plane 30' to define the "frame" bounding the image which a viewer/operator will observe on the video display screen 26. The initial image is then projected, pixel-by-pixel, using a perspective transform, back onto the predicted image plane to account for the forward motion. This gives a reasonable estimate as to what the operator will see at a time that is advanced 2D into the future.

The ground plane 32 is defined as being approximately coplanar with the surface (ground, road, bridge, floor, etc.) over which the UGV is travelling at the instant time, and should preferably account for any grade or cross-slope of the surface. In this disclosed embodiment of the invention, it may be defined as being tangent to the contact points or patches of the traction-producing devices (wheels, tracks, legs, rollers, etc.) of the UGV (see, for example, the wheels shown in FIG. 3). As used in reference to the ground plane 32, "approximately coplanar" is defined as being within a range of ±10° of the surface.

The far plane 34 is defined as being approximately normal to the ground plane 32 and offset from the UGV 12 in a direction of current and/or expected movement of the UGV. The distance by which the far plane is offset from the UGV 12 must be greater than a distance that can be covered by the UGV during the communication latency period when travelling at its maximum attainable speed. It has been found (during simulated operation of a UGV using the disclosed method) that good results may be obtained by setting the offset distance to the far plane equal to twice that maximum possible vehicle travel distance. As used in reference to the far plane 34, "approximately normal" is defined as being within a range of ±10° of normal to the ground plane 32.

FIGS. 7A-C show how the initial and predicted images from the above example would appear when as viewed on a video screen 26. FIG. 7A shows the initial image, where the lower extent of the image (corresponding to point G in FIG. 6) is identified as G, the upper extent of the image (corresponding to point H in FIG. 6) is identified as H, and horizontal line I separating the image into a top portion (associated with the far plane 34) and a bottom portion (associated with the ground plane 32). 7B shows the predicted image frame (including lower and upper boundaries G' and F') as "viewed" by the forward-moved camera overlaid on the original image. 7C shows the subsequent transformed image from the perspective of the predicted camera position. Note that part of the original image is "lost" along all four edges as the UGV moves forward to its predicted position. Only longitudinal vehicle motion is illustrated in this example, however the disclosed approach is capable of incorporating lateral and yaw motion as well, and therefore can fully account for planar motion.

Figure 8:
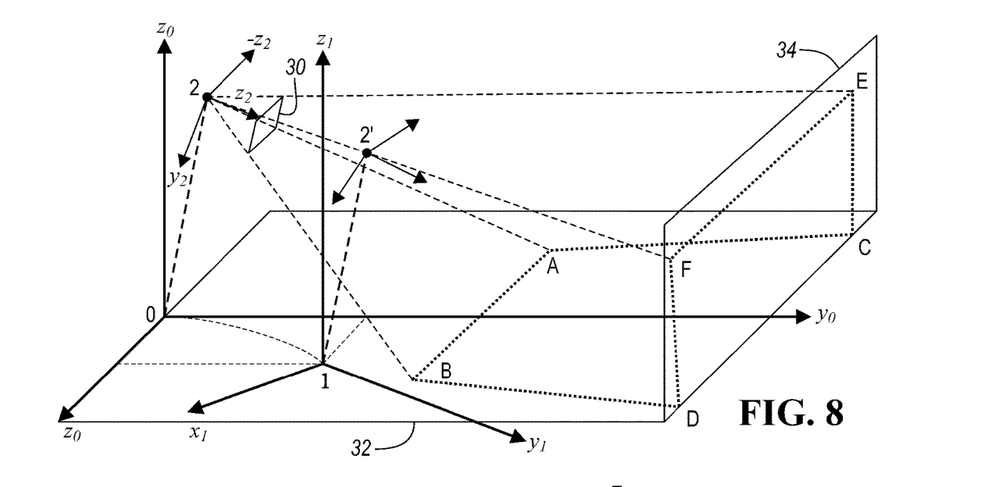
FIG. 8 depicts the multiple frames-of-reference utilized in an image perspective transform according to an embodiment of the invention.

Referring now to FIG. 8, the predictive display is configured and defined with reference to three coordinate systems (frames-of-reference). The global frame-of-reference denoted by "0" represents the notional location of the UGV 12 when the initial digital image is obtained at $t_i$. It represents the no-delay case. "0" is also the frame-of-reference in which the ground plane 32 and far plane 34 remain fixed. (Note that frame-of-reference "0" does not correspond to the frame-of-reference A in the vehicle state estimator as shown in FIG. 3.) The vehicle frame-of-reference is denoted by "1" and represents the location of the vehicle after its position has evolved over the round-trip delay time interval of 2D as predicted by the SE 22. The camera frame-of-reference denoted by "2" represents the location of the camera 18 in the vehicle frame-of-reference. In this disclosed example, the camera frame-of-reference "2" is fixed with respect to the UGV 12, but in general this need not be the case. The frame-of-reference "2'" represents frame-of-reference "2" with respect to the global frame-of-reference "0".

FIG. 8 also depicts the position of the initial image plane 30 (as defined within the camera frame-of-reference "2") and the rays (in dashed lines) showing the projection of the two lower corners of the initial image plane toward the ground plane 32 where they establish points A and B, and the two upper corners toward the far plane 34 where they establish points E and F. The dotted lines on the ground and far planes 32, 34 therefore define the "frame" which indicates the lateral and vertical extent of the image captured by the camera and which would be displayed on the a video screen 26 at initial time $t_i$ if there were no communication time delay.

Figure 9A:
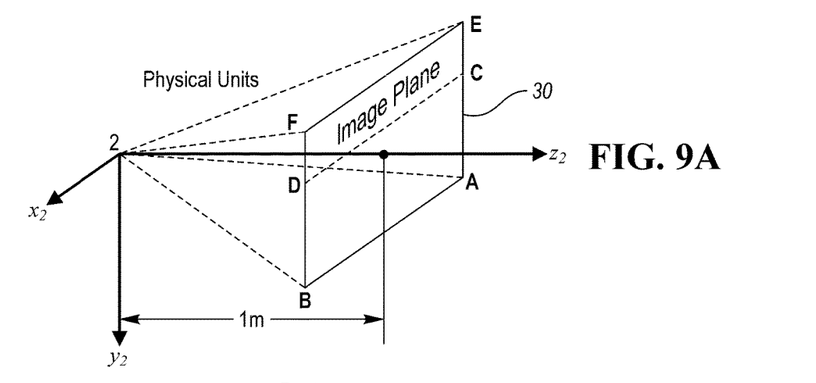
FIG. 9A depicts an initial image plane as defined in a camera frame-of-reference using physical units.

The camera frame-of-reference "2" is illustrated in FIG. 9A, with the initial image plane 30 located in physical units in the camera coordinate system. The size, location, and orientation of the initial image plane 30 may be established relative to the origin/position of the camera 18 using a pinhole camera model, as is well known in the field of computer/synthetic vision. In the instant case, it is assumed that the camera and video display screens are generally rectangular in shape, so that the corner points A, B, E, F defining a rectangular frame are sufficient to define an extent of the digital image that is captured on the image plane and transmitted for viewing. If the image that is to be captured, processed, and ultimately presented on a video display is other than rectangular in shape, then different reference points may be selected to define the extent of the image, and mathematical transforms other than those discussed below may be employed. Points C, D establish an apparent horizon line on the initial image plane 30, corresponding to the line of intersection I between the ground and far planes 32, 34. The locations of these points is discussed below.

Figure 9B:
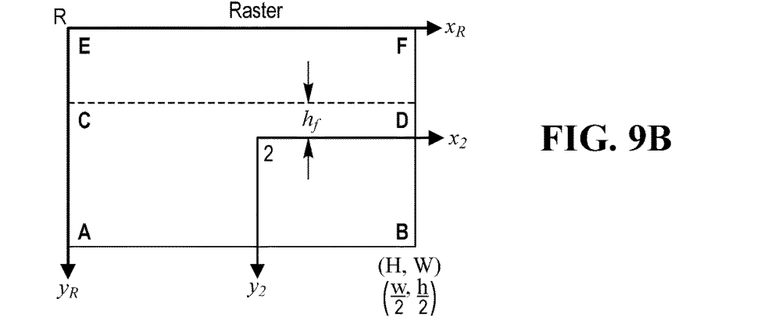
FIG. 9B depicts the initial image plane of FIG. 9B translated to pixel units as a raster.

FIG. 9B illustrates the initial image plane 30 when translated to pixel units as a raster, with XGA resolution of 1024×768 used in this example. Conversion between raster and image plane coordinates is well known in the art, and can be found in any computer vision text.

Figure 10:
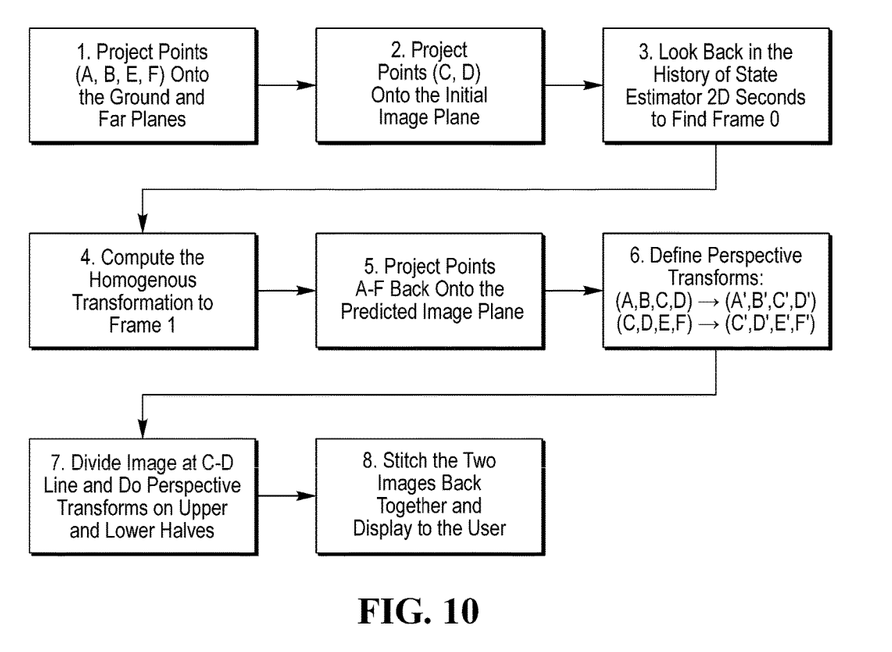
FIG. 10 depicts steps associated with the perspective transformation according to an embodiment of the invention.

The steps associated with the perspective transformation are illustrated in FIG. 10, and are described in detail in the remainder of this disclosure.

Step 1:

Mapping of image extent reference points A, B, E, F onto the ground and far planes. This step may be done in preprocessing as long as the camera is fixed to the vehicle. First define camera parameters such as field of view $\vartheta$ and aspect ratio $\alpha$. The height and width of the image plane are, $$w = 2 \tan\frac{\vartheta}{2},$$
$$h = \alpha w,$$
$$\varphi = 2 \tan^{-1}\frac{h}{2},$$
(11)

where w and h are the width and height (in meters) of the image plane and $\varphi$ is he vertical field of regard of the camera. Capital letters W and H are used to denote the width and height of the raster in pixels. Using XGA as per the current example, W=1,024 and H=768

Figure 11:
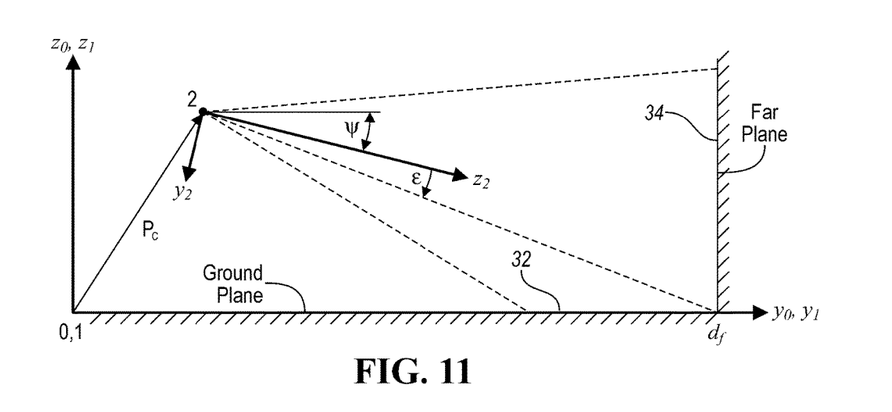
FIG. 11 depicts a camera in a frame-of-reference as used to define rotation matrices as used in an embodiment of the invention.

FIG. 11 illustrates the situation of the camera (located at the origin of frame-of-reference "2") with respect to frame-of-reference "1" and also illustrates the location of the far plane with respect to frame-of-reference "1" when it coincides with frame-of-reference "0" (before the vehicle-mounted camera has moved from its initial location). Let $\psi$ be the down angle of the camera and $p_c$ be the position of the camera in frame-of-reference "1". Let $d_f$ be the distance of the far plane 34 from the origin of frame-of-reference "0". Furthermore let $\varepsilon$ be the angle between the z axis and the line traced from the origin of "2" to the intersection of the ground and far planes 32, 34.

Given these definitions, let the rotation matrix between frames "1" and "2" be $$R_1^2 = \begin{bmatrix} -1 & 0 & 0 \\ 0 & -\sin\psi & \cos\psi \\ 0 & -\cos\psi & -\sin\psi \end{bmatrix},$$
(12)

and the homogeneous transformation be $$H_1^2 = \begin{bmatrix} R_1^2 & p_c \\ 0^T & 1 \end{bmatrix}.$$
(13)

The computation proceeds as follows. First, project the lower image plane reference points A and B (see FIG. 12) onto the ground plane 32. For point A, its position in the camera frame is $$v_2^A = \begin{bmatrix} \frac{-w}{2} & \frac{h}{2} & 1 \end{bmatrix}^T.$$

To map A to the ground plane, the following equation must hold for unknown $\gamma$ $$(p_c + \gamma R_1^2 v_2^A)^T n_g = 0,$$
(14)

where $n_g$ is a vector normal to the ground plane. The solution to this equation yields $$\gamma = \frac{-p_{c,z}}{v_{1,z}^A}.$$

where the z in the subscript indicates that the z component of the vector is used. This then yields $$v_0^A = p_c + \gamma R_1^2 v_2^A$$
(15)

The same procedure is used for B.

Next, the upper image frame reference points E and F are mapped/projected onto the far plane 34. Dealing first with point E, let $$v_2^E = \begin{bmatrix} \frac{-w}{2} & \frac{-h}{2} & 1 \end{bmatrix}^T,$$

then the following equation must hold for unknown $\eta$ $$(p_c + \eta R_1^2 v_2^E - p_f)^T n_f = 0,$$
(16)

where $p_f$ is the vector to the intersection of the far and ground plane and $n_f$ is a vector normal to the far plane. The solution to this equation yields $$\eta = \frac{h_f - p_{c,y}}{v_{1,y}^E}.$$

Where the symbol y in the subscript indicates that the y component of the vector is used. This then yields $$v_0^E = p_c + \eta R_1^2 v_2^E. \tag{17}$$

The procedure explained above may similarly be applied to the point F. Thus, the points A, B, E, F defined on the initial image plane 30 (see FIG. 9A) are mapped/projected forward (in the direction of movement of the UGV 12) onto the ground and far planes 32, 34 as shown in FIG. 8. The resultant projected points are also identified as A, B, E, F.

Step 2:

Mapping of points C & D onto the initial image plane. Unlike points A, B, E, F which were well-defined in the camera frame-of-reference (initial image plane 30) but unknown in the global frame-of-reference "0", points C and D are fairly well defined in the global frame-of-reference "0" (since they lie on the intersection between the ground and far planes 32, 34), but not well defined in the image frame-of-reference. First observe that they need to be on the left and right edges of the image so their x coordinate will be $$\pm \frac{w}{2}.$$

It can easily be shown that $$\varepsilon = \tan^{-1} \frac{d_f - p_{c,y}}{p_{c,z}} + \psi - \frac{\pi}{2}$$

(see FIG. 11). It is straightforward to calculate $h_f = \tan \varepsilon$ (see FIG. 9) Then let $$v_2^C = \left[\frac{-w}{2} \ h_f \ 1\right]^T$$

and proceed with the same method outlined in equations (14) and (16). The same process applies to point D. This step may also be precomputed as long as the camera and far plane are not moving from time step to time step.

Step 3:

Determine position evolution over 2D. This step recalls a prior state from the buffer so that a relative position between the current and prior state may be computed in the next step. The states stored in the buffer take the following form $[x_k \ y_k \ \theta_k \ t_k]$ which includes the 3 degree-of-freedom position and the time at which the state was computed. Assuming that the round trip time is known, which is denoted as $\tau$ (identified as 2D elsewhere), the algorithm looks back in the buffer i steps until $t_k - t_{k-i} \geq \tau$. When this condition is met, let j=k-i.

Step 4:

Compute the transformation from frame-of-reference 0 to 1. These two states (at sample k and j) are then encoded as homogeneous transformations as $$R_{A_{k,j}}^B = \begin{bmatrix} \cos \theta_{k,j} & -\sin \theta_{k,j} & 0 \\ \sin \theta_{k,j} & \cos \theta_{k,j} & 0 \\ 0 & 0 & 1 \end{bmatrix}, \tag{18}$$

$$p_{k,j} = [x_{k,j} \ y_{k,j} \ 0]^T, \tag{19}$$

$$H_{A_{k,j}}^B = \begin{bmatrix} R_{A_{k,j}}^B & p_{k,j} \\ 0^T & 1 \end{bmatrix}, \tag{20}$$

where the indices k, j indicates that the computation is made for k and j independently. The instantaneous transformation between frames-of-reference "0" and "1" is then $$H_{0_k}^1 = H_{A_j}^{B-1} H_{A_k}^B \tag{21}$$

Step 5:

For each of the points A-F and their corresponding global positions $v_0^A, \ldots, v_0^F$ computed in steps 1 and 2, they are translated back into the future/predicted image plane 30' as follows $$\begin{bmatrix} v_2^A \\ 1 \end{bmatrix} = H_1^{2-1} H_{0_k}^{1-1} \begin{bmatrix} v_0^A \\ 1 \end{bmatrix}. \tag{22}$$

Figure 12:
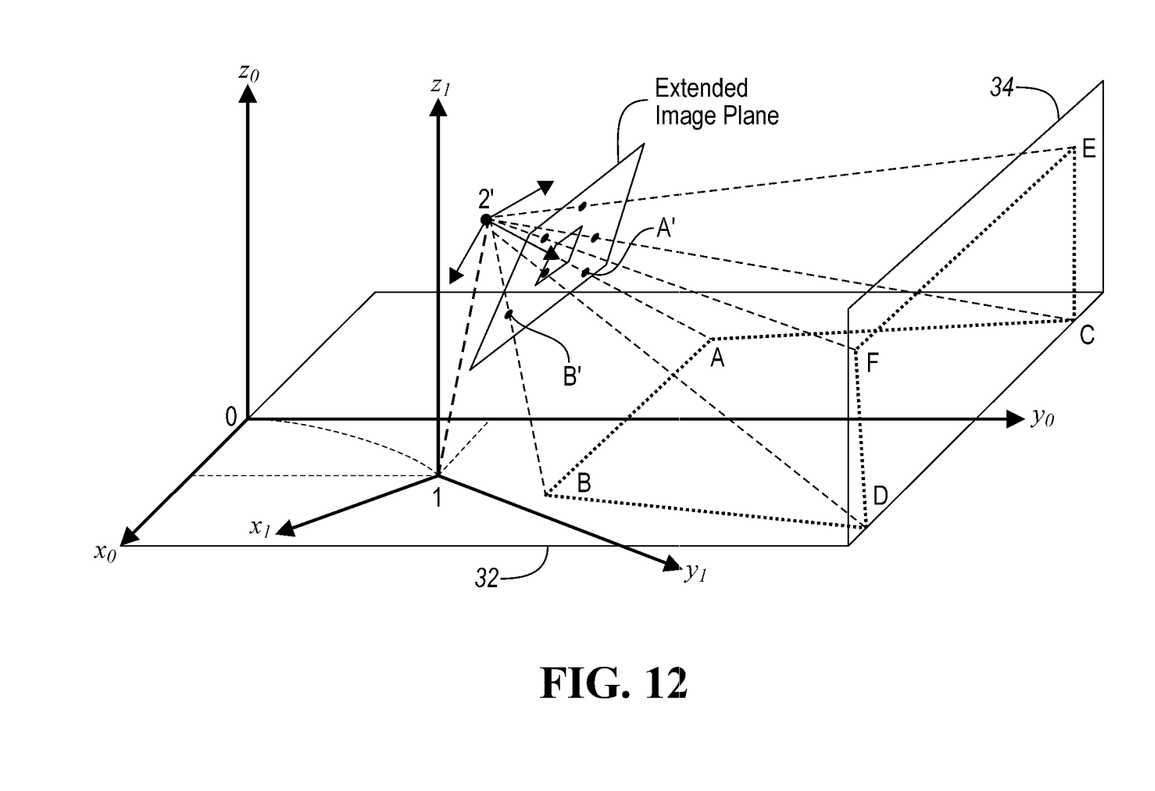
FIG. 12 illustrates projection of reference points from far and ground planes onto a predicted image plane to define a perspective adjusted frame according to an embodiment of the invention.

This mathematical projection yields the corresponding points A'-F' in the predicted image plane 30' (as defined in the camera frame-of-reference "2'"), which are then converted to planar coordinates as follows $$u^A = \begin{bmatrix} u_x^A \\ u_y^A \end{bmatrix} = \begin{bmatrix} v_{2,x}^A / v_{2,z}^A \\ v_{2,y}^A / v_{2,z}^A \end{bmatrix}, \tag{23}$$

where $v_2^A = [v_{2,x}^A, v_{2,y}^A, v_{2,z}^A]^T$. Finally once the desired points are obtained in physical coordinates, the last step is to convert them to raster coordinates (i.e. pixels) as follows.

$$r_x^A = u_x^A \frac{W}{w} + \frac{W}{2}, \tag{24}$$

$$r_y^A = u_y^A \frac{H}{h} + \frac{H}{2}. \tag{25}$$

where capitals (W, H) represent the size in pixels and lower case (w, h) are physical units. The same procedure is used for points B-F respectively. This process is illustrated in FIG. 12, where, for clarity, only the two lower points A' and B' are labelled. There the plane containing the predicted image plane 30' is extended to permit the projected points to fall outside of the bounds of the image itself.

Figure 13A:
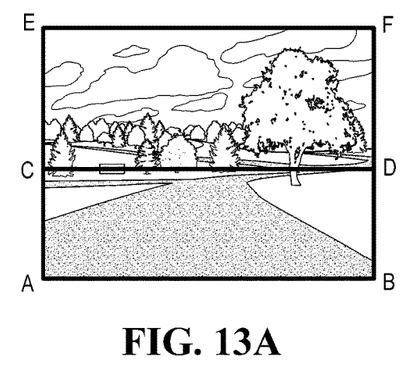
FIGS. 13A and 13B illustrate the movement of reference points defining the extents of the image on the initial image plane as are transformed into a perspective adjusted frame according to an embodiment of the invention.
Figure 13B:
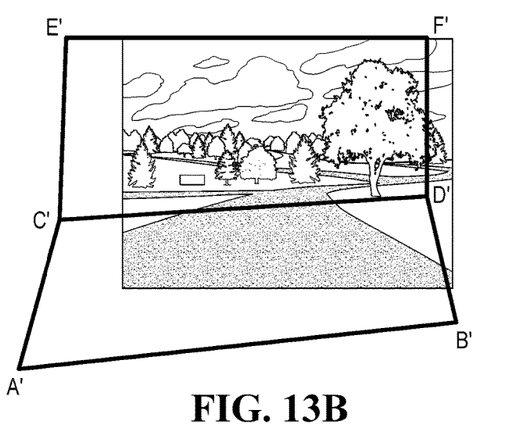

FIGS. 13A and 13B illustrate how the original reference points A-F which define the extents of the image on the initial image plane (13A) "move" as a result of being projected "forward" onto the ground and far planes, then "back" again onto the predicted image plane as points A'-F' (13B). The predicted points A'-F' are therefore seen to constitute a perspective adjusted frame corresponding to the extents of the initial image that would be visible to the camera located and oriented in its predicted position. Fi Note that the projected points will not typically land back within the boundaries of the initial image. These mappings will be used to define two perspective transformations.

Step 6:

Define the perspective transforms. Two perspective transforms are defined, one for the ground plane which is uniquely defined by the mapping (A, B, C, D)→(A', B', C', D') and one for the far plane (C, D, E, F)→(C', D', E', F'). The perspective transform for the ground plane has the following form $$\begin{bmatrix} ar^{A'} & br^{B'} & cr^{C'} & dr^{D'} \\ a & b & c & d \end{bmatrix} = M_{GRD} \begin{bmatrix} r^A & r^B & r^C & r^D \\ 1 & 1 & 1 & 1 \end{bmatrix}, \quad (26)$$

and for the far plane, $$\begin{bmatrix} er^{C'} & fr^{D'} & gr^{E'} & hr^{F'} \\ e & f & g & h \end{bmatrix} = M_{FAR} \begin{bmatrix} r^C & r^D & r^E & r^F \\ 1 & 1 & 1 & 1 \end{bmatrix} \quad (27)$$

where $M_{GRD} \in \mathbb{R}^{3 \times 3}$, $M_{FAR} \in \mathbb{R}^{3 \times 3}$ and a, ..., h are arbitrary constants. The perspective transform may be computed using an image processing library such as OpenCV. Specifically the function getPerspectiveTransform( ) may be used to compute the transform for both the ground and far plane.

Figure 14:
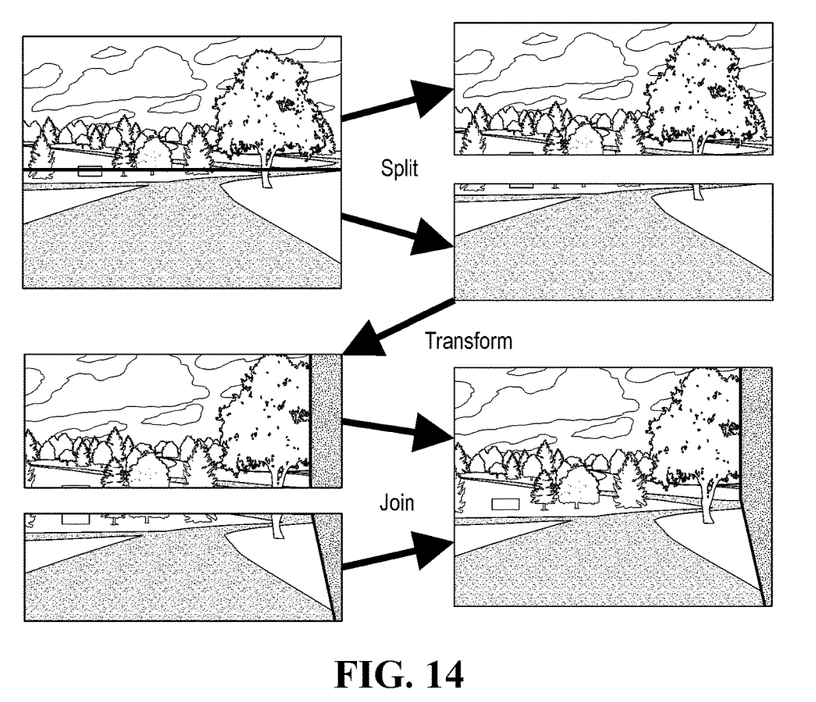
FIG. 14 illustrates progressive steps in an image perspective transform according to an embodiment of the invention.

Step 7:

Split the initial image and transform each portion. In this step the initial image is split along the apparent horizon line C-D, with the portion below associated with the ground plane and the portion above associated with the far plane (FIG. 14, top left to top right). These two sub-images are then transformed separately from one another using the learned perspective transforms $M_{GRD}$ and $M_{FAR}$ to generate a predicted upper image on the upper portion of the predicted image plane and a predicted lower image on the lower portion of the predicted image plane (FIG. 14, bottom left). (Note that care must be taken to make sure that the mapped points correspond to the divided image.) This may be done, for example, using the well-known OpenCV warpPerspective( ) function (published in the *Open Source Computer Vision Library*, see http://opencv.org), which maintains the bounds of the initial image.

It may be desirable in some cases to provide for some vertical overlap between the upper and lower portions of the initial image. For example, if the line C'D' as projected onto the predicted image plane is not horizontal (as in FIG. 13B), the lower boundary of upper portion may extend downward as far as the lowermost of C' and D', and the upper boundary of the lower portion may extend upward as far as the uppermost of C' and D'.

FIG. 13 illustrates two notable features inherent in the disclosed method. First there are pixels which map outside of the extent of the initial image; these points are lost in the destination image. In the depicted example in which the UGV is making a gentle right turn during the latency period 2D, some pixels at left edge of image are "lost" since that part of the image will not be within the camera's field-of-view after the turn. Second, there are pixels in the destination image which are mapped to points outside of the bounds of the initial image. As such, there is no source information for these pixels and they may be simply shown in black (or any other color).

Step 8:

Join the transformed images. Finally rejoin the two sub-images along the horizontal dividing line and present them to the operator/user/viewer on a video display screen. This may be performed using a digital image stitching technique of a type well known in the art. The step is illustrated in FIG. 14, in the transition from bottom left to bottom right. The digital image stitching technique will resolve the vertical overlap between the upper and lower transformed images.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of generating a predictive image on a video display during tele-operation of an unmanned ground vehicle (UGV), the predictive image adjusted for a delay period due to round-trip wireless communication latency between the video display and the UGV, the method comprising:

a) operating a camera onboard the UGV to obtain a digital image of a vehicle environment;

b) defining an initial image plane established by an initial position of the camera at an initial time;

c) defining a predicted image plane (PIP) established by a predicted camera position at a future time assuming movement of the UGV in accordance with a vehicle dynamics model as a state estimator during the delay period;

d) defining a mathematical transformation to alter the digital image to simulate a view of the camera from a perspective of the predicted camera position;

e) performing the mathematical transform on the digital image to generate the predictive image; and f) displaying the predictive image using the video display; the method CHARACTERIZED IN THAT:

the above step d) of defining the mathematical transform comprises:

1) identifying a set of points on the initial image plane defining an extent of the digital image;

2) projecting a first subset of the set of points onto a ground plane to define thereon a lower projected frame (LPF), the ground plane being approximately tangent to a traction-producing means of the UGV;

3) projecting a second subset of the set of points onto a far plane to define thereon an upper projected frame (UPF), the far plane being approximately normal to the ground plane and offset from the UGV in a direction-of-movement of the UGV;

4) projecting the UPF from the far plane onto the PIP to define an upper Perspective Adjusted Frame (PAF) portion;

5) projecting the LPF from the ground plane onto the PIP to define a lower PAF portion, the upper and lower PAF portions together comprising the PAF;

6) defining a first mathematical perspective transform to map the UPF onto the upper PAF portion, and 7) defining a second mathematical perspective transform to map the LPF onto the lower PAF portion; and the above step e) of performing the mathematical transform on the digital image comprises:

1) performing the first mathematical perspective transform on an upper portion of the digital image to generate a predicted upper image on an upper portion of the PIP;
2) performing the second mathematical perspective transform on a lower portion of the digital image to generate a predicted lower image on a lower portion of the PIP; and
3) rejoining the predicted upper image and the predicted lower image.

2. The method of claim 1 wherein the far plane is offset from the UGV by a maximum distance the UGV is capable of travelling during the delay.

3. The method of claim 1 wherein the extent of the digital image defined by the set of points is a rectangular frame corresponding to an outermost boundary of the digital image detected by the camera.

4. The method of claim 1 wherein at least one of the initial image plane and the predicted image plane is established using a pinhole camera model.

5. A method of generating a predictive image on a video display during tele-operation of an unmanned ground vehicle (UGV), the predictive image adjusted for a round-trip wireless communication delay (2D) between the video display and the UGV during vehicle movement in accordance with an assumed vehicle dynamics model as a state estimator, the method comprising:
 a. operating a camera onboard the UGV to obtain a digital image of a vehicle environment;
 b. defining an initial image plane established by an initial position of the camera at an initial time $t_i$;
 c. defining a ground plane approximately tangent to a traction-producing means of the UGV;
 d. defining a far plane approximately normal to the ground plane and offset from the UGV in a direction-of-movement of the UGV;
 e. defining an apparent horizon line at an intersection between the ground plane and the far plane;
 f. projecting, using a mathematical mapping technique, a set of points defining an extent of the digital image (A,B,E,F) from the initial image plane, so that a first subset of the set of points (A,B) maps onto the ground plane and a second subset of the set of points (E,F) maps onto the far plane;
 g. projecting the apparent horizon line onto the initial image plane and defining points (C, D) thereon where the projected apparent horizon intersects respective left and right extents of the initial image plane;
 h. defining a predicted image plane established by a predicted camera position at a future time $t_f$ assuming movement of the UGV in accordance with the vehicle dynamics model and the state estimator during the delay 2D;
 i. projecting, using a mathematical mapping technique, an upper projected frame (C,D,E,F) from the far plane onto the predicted image plane, and projecting a lower projected frame (A,B,C,D) from the ground plane onto the predicted image plane, the upper and lower projected frames combining to define a perspective adjusted frame (A'-F');
 j. defining a first mathematical perspective transform to map the upper projected frame (C,D,E,F) onto a corresponding upper portion of the perspective adjusted frame (C',D',E',F');
 k. defining a second mathematical perspective transform to map the lower projected frame (A,B,C,D) onto a corresponding lower portion of the perspective adjusted frame (A',B',C',D');
 l. performing the first mathematical perspective transform on an upper portion of the digital image to generate a predicted upper image on an upper portion of the predicted image plane;
 m. performing the second mathematical perspective transform on a lower portion of the digital image to generate a predicted lower image on a lower portion of the predicted image plane;
 n. rejoining the predicted lower image and the predicted upper image to create the predictive image; and
 o. displaying the predictive image using the video display.

6. The method of claim 5 wherein the far plane is offset from the UGV by a maximum distance the UGV is capable of travelling during the delay.

7. The method of claim 5 wherein the extent of the digital image defined by the set of points is a rectangular frame corresponding to an outermost boundary of the digital image detected by the camera.

8. The method of claim 5 wherein at least one of the initial image plane and the predicted image plane is established using a pinhole camera model.

9. The method of claim 5 wherein the far plane is offset from the UGV by twice a maximum distance the UGV is capable of traveling during the delay.

10. The method of claim 5 wherein the ground plane is approximately co-planar with a surface over which the UGV is traveling.

11. The method of claim 10 wherein the ground plane is within a range of +/− 10 degrees of the surface over which the UGV is traveling.

12. The method of claim 11 wherein the far plane is within a range of +/− 10 degrees of normal to the ground plane.

13. The method of claim 5 further comprising:
 storing a series of positions associated with the UGV in a buffer; and wherein
 the step of defining the predicted image plane includes recalling at least one prior position from the buffer.

14. The method of claim 5 wherein:
 a portion of the predicted upper image on the upper portion of the predicted image plane overlaps with a portion of the predicted lower image on the lower portion of the predicted image plane; and
 the step of rejoining the predicted lower image and the predicted upper image includes resolving the overlap between the predicted lower image and the predicted upper image.

15. The method of claim 1 wherein the far plane is offset from the UGV by twice a maximum distance the UGV is capable of travelling during the delay.

16. The method of claim 1 wherein the ground plane is approximately co-planar with a surface over which the UGV is traveling.

17. The method of claim 11 wherein the ground plane is within a range of +/− 10 degrees of the surface over which the UGV is traveling.

18. The method of claim 17 wherein the far plane is within a range of +/− 10 degrees of normal to the ground plane.

19. The method of claim 1 further comprising:
 storing a series of positions associated with the UGV in a buffer; and wherein
 the step of defining the PIP includes recalling at least one prior position from the buffer.

20. The method of claim 1 wherein:
a portion of the predicted upper image on the upper portion of the PIP overlaps with a portion of the predicted lower image on the lower portion of the PIP; and
the step of rejoining the predicted upper image and the predicted lower image includes resolving the overlap between the predicted upper image and the predicted lower image.

* * * * *